(12) United States Patent
Cox et al.

(10) Patent No.: US 7,584,264 B2
(45) Date of Patent: Sep. 1, 2009

(54) DATA STORAGE AND RETRIEVAL SYSTEMS AND RELATED METHODS OF STORING AND RETRIEVING DATA

(75) Inventors: Fredric L. Cox, San Jose, CA (US); Dorion A. Carroll, San Francisco, CA (US); Peter Kevin Lund, San Francisco, CA (US); Michael J. Oswall, San Francisco, CA (US); Scott M. Petry, Menlo Park, CA (US); Jon H. Prall, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 1093 days.

(21) Appl. No.: 10/643,489

(22) Filed: Aug. 19, 2003

(65) Prior Publication Data

US 2005/0044170 A1 Feb. 24, 2005

(51) Int. Cl.
*G06F 15/16* (2006.01)
(52) U.S. Cl. .................................. 709/217; 709/211
(58) Field of Classification Search ................. None
See application file for complete search history.

(56) References Cited

U.S. PATENT DOCUMENTS

| | | | |
|---|---|---|---|
| 5,416,915 A | 5/1995 | Mattson et al. | |
| 5,557,770 A | 9/1996 | Bhide | |
| 5,742,668 A | 4/1998 | Pepe et al. | |
| 5,799,307 A | 8/1998 | Buitron | |

(Continued)

OTHER PUBLICATIONS

EMC News Release, "EMC Launches Centera, Ushers in New Era of Content-Addresses Storage," New York, Apr. 29, 2002. www.emc.com/news/press_releases/view.jsp?id=1254.

(Continued)

*Primary Examiner*—John B. Walsh
(74) *Attorney, Agent, or Firm*—Baker & McKenzie LLP (57) ABSTRACT

Data storage and retrieval systems and related methods are disclosed herein. In one aspect, a system includes data processing servers configured to receive incoming data and transmit the data for storage. The system also includes data storage servers each coupled to one or more data storage units and configured to receive transmitted data for writing to the one or more data storage units, and to read data from the one or more data storage units. Furthermore, the systems may include data retrieval servers coupled to one or more of the data storage servers and configured to retrieve data from the one or more data storage units. The system further includes process modules each associated with one of the data storage servers, where at least two of the process modules are configured to write a portion of the data to corresponding data storage units. In addition, each of the process modules are configured to transmit an acknowledgment associated with each of the corresponding at least two data storage units upon the writing of the data portion in the at least two data storage units. Furthermore, some embodiments may include a key manager coupled to the data processing servers and configured to receive keys that indicate the location of the data portions in the one or more data storage units. Additionally, each data retrieval server may be coupled to the key manager and employ the keys to retrieve data from the one or more data storage units.

10 Claims, 6 Drawing Sheets

U.S. PATENT DOCUMENTS

| | | | |
|---|---|---|---|
| 5,964,886 A | 10/1999 | Slaughter et al. | |
| 6,021,408 A | 2/2000 | Ledain et al. | |
| 6,167,402 A | 12/2000 | Yeager | |
| 6,230,190 B1 * | 5/2001 | Edmonds et al. | 709/213 |
| 6,345,368 B1 * | 2/2002 | Bergsten | 714/11 |
| 6,353,834 B1 | 3/2002 | Wong et al. | |
| 7,149,769 B2 * | 12/2006 | Lubbers et al. | 709/201 |
| 7,197,571 B2 * | 3/2007 | Sarkar et al. | 709/237 |
| 2003/0212870 A1 * | 11/2003 | Nowakowski | 711/162 |

OTHER PUBLICATIONS

Rosenblum et al., The Design and Implementation of a Log-Structured File System, ACM Transactions on Computer Systems, Feb. 1992, pp. 26-52, vol. 10 No. 1.

* cited by examiner

DATA STORAGE AND RETRIEVAL SYSTEMS AND RELATED METHODS OF STORING AND RETRIEVING DATA

TECHNICAL FIELD

Disclosed embodiments herein relate generally to data storage and retrieval, and more particularly to data storage and retrieval systems and related methods of storing and retrieving data employing redundant data storage over TCP/IP connection across a computer network.

BACKGROUND

The use of data storage systems to store large amounts of data has continued to gain popularity in today's digital age. A common use for such storage systems is for the storage of large numbers of electronic mail (e-mail) messages and message data filtered using various parameters. Companies employing data storage systems for such so-called "spam" e-mail filtering systems typically need to store millions or even billions of blocks of data reliably and safely. In addition, the storage of such large amounts of data also typically requires data transfer rates of thousands of data blocks per second, and accessible within fractions of a second. Moreover, later access of the stored data should be accessible either sequentially or randomly to more efficiently and quickly retrieve or delete the data, without bogging down the system.

Conventional systems employ large databases with file systems, such as Veritas®, on larger RAID (Redundant Array of Inexpensive Disks) systems. Although such conventional systems may eventually be capable of achieving the extreme write and access speeds discussed above, such capabilities are typically so expensive as to escape the budget of all but the largest companies. In some cases, even the most expensive of such systems still cannot handle extremely large numbers of data blocks without bogging down to some extent. Accordingly, a need exists for novel data storage systems and related methods.

BRIEF SUMMARY

Data storage and retrieval systems and related methods are disclosed. In one aspect, a system includes a data processing server configured to receive incoming data and to transmit the data for storage. The system also includes a plurality of data storage servers each coupled to one or more data storage units and configured to receive transmitted data for writing to the one or more data storage units, and configured to read data from the one or more data storage units. Furthermore, the systems in this embodiment includes a data retrieval server coupled to one or more of the plurality of data storage servers and configured to retrieve data read by the one or more data storage servers from the one or more data storage units. The system still further includes a plurality of process modules each associated with one of the plurality of data storage servers, where at least two of the process modules configured to write a portion of the data to corresponding data storage units. In addition, each of the at least two process modules are further configured to transmit an acknowledgment associated with each of the corresponding at least two data storage units upon the writing of the portion of data in the corresponding at least two data storage units.

In another aspect, a data storage and retrieval system, and related method, comprise a data processing server configured to receive incoming data and to transmit the data for storage, and a plurality of data storage servers each coupled to one or more of a plurality of data storage units and configured to receive a portion of the data for writing to at least two of the plurality of data storage units. In this embodiment, the system also includes storage server records comprising configuration information corresponding to connection path and availability of each of the plurality of data storage servers. In addition, the system includes a domain name system server coupled to the data processing server and configured to store the storage server records and to supply the storage server records to the data processing server for use in identifying at least two of the plurality of data storage servers having an available connection. In such an embodiment, the data processing server is further configured to establish connections with the at least two data storage servers based on the identification of the at least two data storage servers using the storage server records.

In yet another aspect, the present disclosure discloses a data storage and retrieval system, and related method, comprising a data processing server configured to receive incoming data and to transmit the data for storage. Also, the system comprises a plurality of data storage servers each coupled to one or more of a plurality of data storage units and configured to receive a portion of the data for writing to at least two of the data storage units. In this aspect, the system further includes a data retrieval server coupled to one or more of the plurality of data storage servers and configured to retrieve the data portion read by the one or more data storage servers and written to the at least two data storage units from one or more of the at least two data storage units. The system still further includes data storage information keys corresponding to each of the data storage units and comprising offset information corresponding to the location of the data portion in the at least two data storage units. Finally, in this embodiment, the system includes a key manager associated with the data retrieval server and configured to store the data storage information keys therein.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion. Reference is now made to the following descriptions taken in conjunction with the accompanying drawings, in which.

DETAILED DESCRIPTION OF PREFERRED EMBODIMENTS

Figure 1:
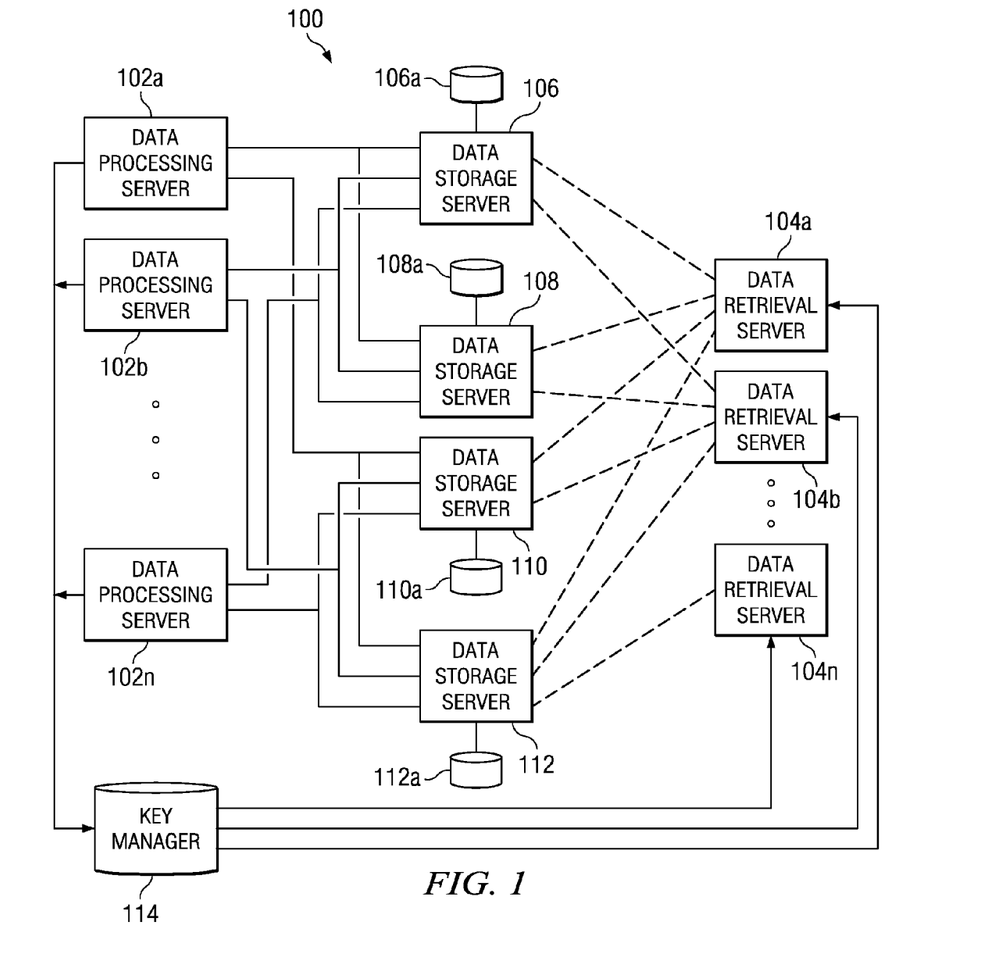
FIG. 1 illustrates one embodiment of a data storage and retrieval system in accordance with the principles disclosed herein.

Referring initially to FIG. 1, illustrated is one embodiment of a data storage and retrieval system 100 constructed in accordance with the principles disclosed herein. The system 100 provides redundant data storage (and data retrieval) and includes a plurality of data processing servers 102a, 102, 102n, and a plurality of data retrieval servers 104a, 104b, 104n. In one embodiment, the data processing servers 102a, 102, 102n may be electronic mail data processing servers (sometimes called "MX servers"), however, they may also be any other type of data processing server configured to receive and transmit data via a computer network. In a related embodiment, the data retrieval servers 104a, 104b, 104n may be electronic mail retrieving servers (sometimes called "WB servers"), which are configured to directly receive transmitting data or retrieve data from another location. In such embodiments, servers 104a, 104b, 104n may be used to receive or retrieve electronic message data via a computer network, as discussed in greater detail below.

Also included in the system 100 is a plurality of data storage servers. Specifically, four data storage servers 106, 108, 110, 112 are shown. In addition, first and second data storage servers 106, 108 may be viewed as a first group of data storage servers, while third and fourth data storage servers 110, 112 may be viewed as a second group. Each of the data storage servers 106, 108, 110, 112 includes one or more data storage units 106a, 108a, 110a, 112a respectively coupled thereto. In an advantageous embodiment, the data storage units 106a, 108a, 110a, 112a are hard disk drives (HDDs) typically used for the storage of data. Moreover, although the data storage units 106a, 108a, 110a, 112a are illustrated externally coupled to the data storage servers 106, 108, 110, 112, in other embodiments the data storage units 106a, 108a, 110a, 112a may be located inside the servers 106, 108, 110, 112. Of course, any type of HDDs or other form of data storage unit, as well as any number of HDDs, may be employed in the system 100, as each application requires.

FIG. 1 also generally illustrates the interconnections provided by the data storage and retrieval system 100. More specifically, when the system 100 is employed to store data chunks (i.e., portions of the incoming data), the data processing servers 102a, 102b, 102n may each be connected to pairs of the data storage servers 106, 108, 110, 112. Moreover, the connections to such pairs may be randomly selected, depending on the application of the system 100. In the illustrated embodiment, the pairs of data storage servers 106, 108, 110, 112 are comprised of the first and second groups mentioned above. Of course, other groupings may also be possible, for example, connecting the first data processing server 102a to the first and third data storage servers 106, 110. In addition, each data processing server 102a, 102b, 102n may be connected to more than two data storage servers, if further data storage redundancy is desired. Exemplary manners of making such connections are discussed in greater detail below. Also, the data processing servers 102a, 102b, 102n are coupled to a key manager 114 for storing information therein, such as information received from the data storage servers 106, 108, 110, 112, which is also further discussed below.

Further connections shown in FIG. 1 are the data retrieval servers 104a, 104b, 104n coupled to each of the data storage servers 106, 108, 110, 112. Specifically, although redundant data storage is provided by simultaneous connections between one of the data processing servers 102a, 102b, 102n and groups of the data storage servers 106, 108, 110, 112, the data retrieval servers 104a, 104b, 104n need only retrieve data from one of the data storage servers 106, 108, 110, 112 at a time. If the stored data chunk/portion cannot be found or retrieved from one of the servers 106, 108, 110, 112, or the data has been corrupted in one of the servers 106, 108, 110, 112, the data retrieval servers 104a, 104b, 104n may simply connect with another of the servers 106, 108, 110, 112 to find and retrieve the desired data. The data retrieval servers 104a, 104b, 104n are also connected to the key manager 114, and such connection may be employed to retrieve information stored in the key manager 114, such as data storage information pertaining to the location of the stored data among the data storage servers 106, 108, 110, 112, as discussed in greater detail below.

Figure 2:
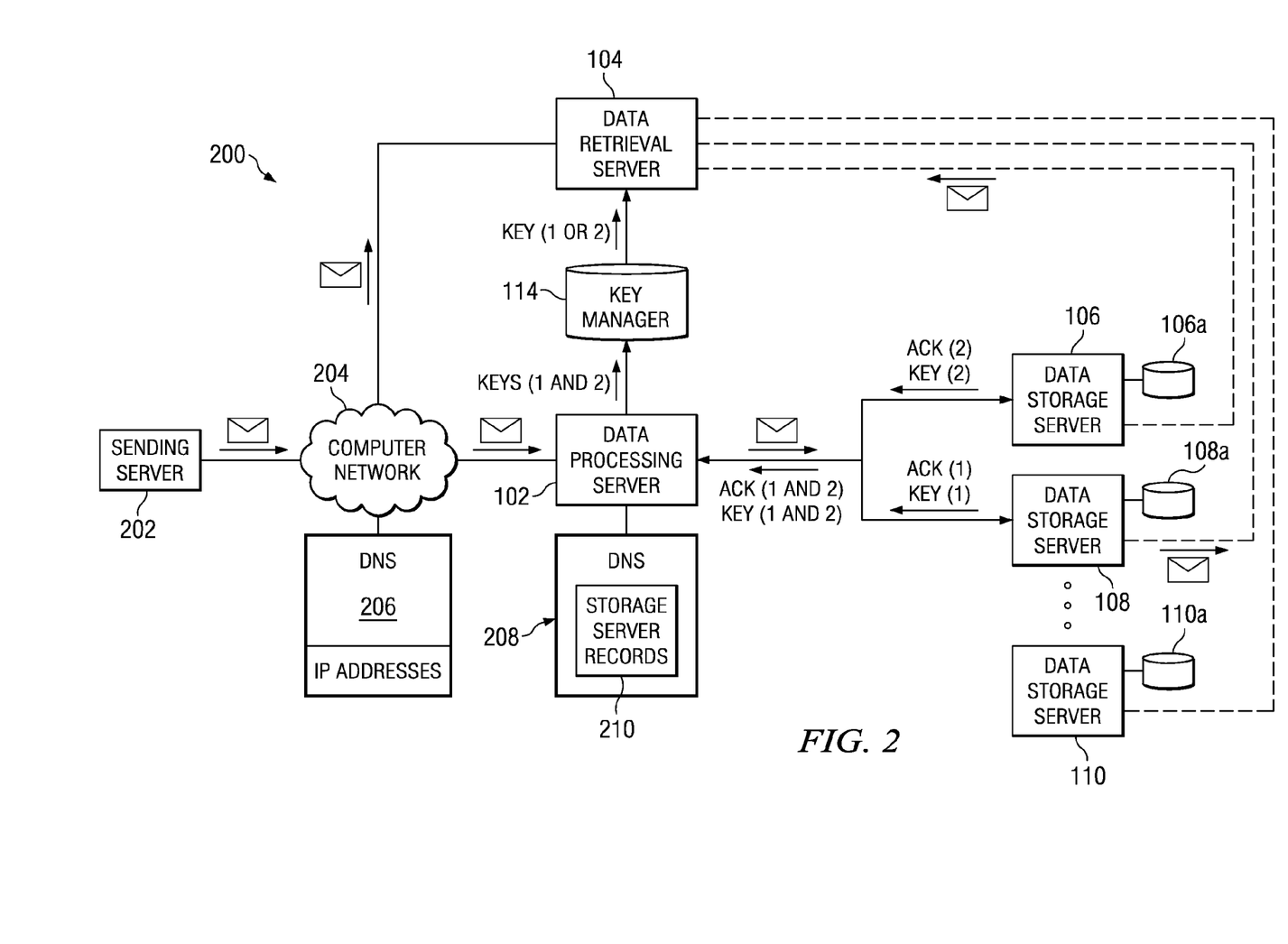
FIG. 2 illustrates a more detailed view of a data storage and retrieval system disclosed herein.

Turning now to FIG. 2, illustrated is a more detailed view of a data storage and retrieval system 200. While FIG. 1 provided a broad view of potential connections between some of the components in a system constructed according to the principles disclosed herein, FIG. 2 provides a specific embodiment of such a data storage and retrieval system 200. As such, FIG. 2 illustrates some components similar to those illustrated in FIG. 1, which are like-numbered accordingly.

The system 200 in FIG. 2 includes a plurality of data storage servers 106, 108, 110, each shown coupled to respective data storage units 106a, 108a, 110a. As before, the data storage units 106a, 108a, 110a may be located inside the data storage servers 106, 108, 110, rather than being external. Also illustrated is a data processing server 102, as well as the key manager 114 connected to both the data processing server 102 and the data retrieval server 104.

FIG. 2 also includes a sending server 202 connected to a computer network 204. In one embodiment, the sending server 202 is an electronic mail server configured to transmit electronic messages from user terminals (not illustrated) across the computer network 204. In another embodiment, the computer network 204 is a packet network, such as the Internet, but other types of computer networks, for example an Ethernet network, may also be employed. Also connected to the computer network 204 is domain name system (DNS) server 206. In embodiments where the computer network 204 includes the Internet, DNS 206 may be employed using conventional techniques. More specifically, when a user sends an electronic message via the sending server 202, the user inputs a desired destination address using the typical format, for instance, "username@postini.com". The DNS server 206 converts the standard e-mail format to a numeric Internet protocol (IP) address, which is commonly expressed in four numbers separated by periods (e.g., 123.45.67.89). The DNS 206 matches the e-mail format to the exact IP address of the desired destination based on the domain portion of the e-mail address (i.e., the text immediately to the right of "@"). More specifically, available hosts/servers are first identified, then the host names are converted to the proper IP addresses, all using appropriate records associated with the DNS server 206. Once the DNS 206 has so matched the IP address, the electronic message, or other data, may then be routed to the specific destination server, which then may transmit the message to the receiving user terminal (not illustrated).

In the illustrated embodiment, the intended destination server is the data retrieval server 104. However, as illustrated, the data processing server 102 may be configured to receive the electronic message before it reaches the retrieval server 104. Specifically, the data processing server 102 may be configured to intercept such incoming data in an effort to filter the data before it arrives at the retrieval server 104. In a specific embodiment, the data processing server 102 may include e-mail spam filtering capabilities employed to lessen the burden of receiving unwanted e-mails at the retrieval server 104. For a more detailed discussion of configuring a data processing server 102 for filtering electronic message data, reference may be made to the co-pending disclosures of Ser. No. 10/370,118, filed Feb. 19, 2003, and entitled "E-mail Management Services", and Ser. No. 09/675,609, filed Sep. 29, 2000, and entitled "Value-Added Electronic Messaging Services and Transparent Implementation Thereof Using intermediate Server", which are both commonly assigned with the present disclosure and incorporated herein by reference in their entirety.

Once the data processing server 102 has received the incoming data, if it is determined by the software modules in the data processing server 102 that the data is to be stored, for example, because it is determined to be spam e-mail, then a specific process module (see FIG. 4) associated with the data processing server 102 processes and transmits the data for storage, in accordance to the principles disclosed herein. Specifically, the process module queries an associated server 208 for available data storage servers 106 ready to receive and store the incoming data. In an advantageous embodiment, the associated server 208 may be another DNS server 208. DNS server 208 may then include storage server records 210, which include configuration information corresponding to the layout and connections of all the data storage servers 106, 108, 110.

In such an embodiment, connections between the data processing server 102 and the data storage servers 106, 108, 110 may be TCP/IP connections, where each of the data storage servers 106, 108, 110 may be identified using an IP address format. Thus, the configuration information would include TCP/IP connection information, and thus IP addresses, associated with each of the data storage servers 106, 108, 110 within the storage server records 210. In addition, the storage server records 210 may be updated with configuration information corresponding to data storage servers added to the plurality of data storage servers 106, 108, 110 as the system 200 grows, as well as in response to the removal of data storage servers from the plurality presently in the system 200. As a result, the system 200 lends itself to the easy addition or removal of data storage servers by simply updating the configuration information in the storage server records 210 within DNS server 208. DNS server 208 will thus be capable of constantly determining which data storage servers are present in the system 200, and provide that information to the data processing server 102.

In function, DNS server 208 is queried by the data processing server 102 to determine the IP addresses of available data storage servers 106, 108, 110 for transmission of the data to those available servers. More specifically, in embodiments where TCP/IP protocols are used in the system 200, the data processing server 102 queries DNS server 208 for the IP addresses of at least two of the plurality of data storage servers 106, 108, 110. At least two such servers are sought so that a redundancy in data storage in the system 200 is provided. As such, if the data stored through one data storage server is lost or corrupted, the second data storage server may be employed to recover the data. Other embodiments may employ more than two of the data storage servers 106, 108, 110, depending on the level of data storage redundancy desired in the system 200.

Once available data storage servers have been identified, the data processing server 102 establishes TCP/IP connections with the selected servers (in the illustrated embodiment, servers 106 and 108 are selected) using the information obtained from the storage server records 210. If a connection with either server 106, 108 cannot be established, or an established connection times-out (for example, because a storage server, such as server 108, is nonfunctional or its associated or internal storage unit is full), the data processing server 102 can simply query DNS server 208 for another group of available data storage servers from the plurality. If the connection is established, the data processing server 102 transmits the data to both of the data storage servers 106, 108 to be written and stored in data storage units 106a, 108a respectively associated with the servers 106, 108.

In one embodiment, to write the data in the data storage units 106a, 108a, the data is compressed in memory and, along with a descriptive header, is put into consecutive memory blocks for direct writing to the data storage units 106a, 108a (e.g., HDDs). If there is little or no traffic in the selected data storage unit 106a, 108a, the process module running in the associated data storage severs causes the block to be written to each of the data storage units 106a, 108a. However, if there is currently a write in progress, the current transaction is held in memory until the writer thread is free. In addition, further incoming data chunks to be stored are concatenated with the first one already held in memory in the same data block until the current write is complete. For example, if the data block comprises a predetermined 64 kb, four data chunks of 16 kb each may be concatenated in the data block and held in memory for a single continuous write. Once the current write is complete, the spooled transactions are then written to the appropriate data storage unit 106a, 108a in one consecutive block for all four data chunks, which is much more efficient than executing, for example, four separate fife writes for the four chunks of data. Of course, the size of the concatenated data can be adjusted to maximize the efficiency of writing to the data storage units 106a, 108a.

Since typically most data in a data storage and retrieval system is written, rather than read (e.g., write:read ratio), employing such a data spooling technique results in a system where most of the writes occur in consecutive blocks, allowing even higher write rates throughout the system 200. The write:read ratio involves the number of writes a data storage system may make to store data to a data storage unit, versus the number of reads of stored data the same system must make to retrieve or delete the data. In contrast to the novel system, conventional systems typically write each chunk of data to a storage unit as an individual file, whereas the present system 200 may be configured to write one single data "bucket", rather than millions of individual files, e.g., one file on the HDD for each chunk of data written. In such an embodiment, the bucket itself may be divided into separate files, not based on each data chunk stored but rather for data block sizing to assist in concatenating the data chunks for writing efficiency.

Another advantage of concatenating the data before writing it to a storage unit includes the ability to seek out large groups of separate data chunks based on storage date, rather than having to seek out each chunk as a separate file. This is especially useful in systems having the capability of mass deleting stored data based on an expiration date, such as the system 200 of FIG. 2. In one embodiment, data chunks stored on a particular date are stored in a single data bucket based on that date, rather than a separate file for each chunk. Such buckets are not limited to a particular data storage server; rather, they extend across all the active data storage servers and are confined to a specific physical location. As a result, all data stored on the specified date is stored in a particular data bucket, regardless of which data storage unit 106a, 108a actually holds the data. Thus, for mass deletion of all the chunks stored on, for example, a certain date, the system 200 is simply employed to delete the single bucket to wipe out all the related data chunks. More specifically, each bucket in each data storage server, which may represent millions of data chunks stored on a single date, may be deleted as a whole, on each data storage server or across all data storage servers in the system 200, just as a single file would in a conventional system, rather than having to locate and delete each data chunk as a separate file. Of course, this approach greatly decreases the time necessary to complete such a task due to decreases in HDD rotational delay and seek times allowed by the sequential data storage.

In an exemplary embodiment, each data bucket will reside in a specific directory on a particular data storage unit 106a, 108a. In addition, a configuration ("config") file on each data storage unit 106a, 108a contains configuration information about the specific bucket, while all other files stored on the data storage units 106a, 108a typically constitute stored incoming data. Those who are skilled in the pertinent field of art will understand how to create such configuration files, as well as how to organize and write the data within those files. Of course, a data storage and retrieval system employing the principles disclosed herein is not necessarily limited to any particular configuration or file format.

Once the data has been written to both of the data storage servers 106, 108, the process modules associated with the data storage servers 106, 108 create and transmit an acknowledgement ACK(1), ACK(2) of the successful data storage from each of the selected servers 106, 108. The acknowledgements ACK(1), ACK(2) are transmitted back to the data processing server 102, which cause the data processing server 102 to stop trying to find available data storage servers in which to safely store the data. In an advantageous embodiment, if acknowledgements ACK(1), ACK(2) are not received from both of the data storage servers 106, 108, indicating the data has been safely stored in storage units associated with servers 106, 108, the data processing server 102 may be configured to abort the writing of the data in those two servers 106, 108, and find a new group of data storage servers through which to transmit the data for storage. Thus, only when both data storage servers 106, 108 send an acknowledgement ACK(1), ACK(2) of the successful writing of the data does the data processing server 102 stop trying to find a group of data storage servers for storing the data.

Also in response to the successful writing of the data in the data storage servers 106, 108, the process modules associated therewith may also create and transmit data storage information keys KEY(1), KEY(2) from each of the data storage servers 106, 108 back to the data processing server 102. The keys include storage information pertaining to the data, such as the location of the data in the data storage units 106a, 108a, when the data was stored, and the size of the data. Further detail regarding keys KEY(1), KEY(2) are discussed below with reference to FIG. 6.

After receiving the keys KEY(1), KEY(2), the data processing server 102 stores the keys KEY(1), KEY(2) in the key manager 114, creating a master index in the key manager 114 of all the different incoming data stored in the data storage units 106a, 108a, 110a associated with the plurality of data storage servers 106, 108, 110 in the system 200. When a user desires to view specific stored data, the data retrieval server 104 is used to retrieve the data from the data storage unit(s) 106a, 108a holding the data. To do so, the data retrieval server 104 queries the key manager 114 to find the appropriate key(s) corresponding to the stored data. For example, the first key KEY(1) may be obtained from the key manager 114, and used to determine the location of the data in data storage unit 108a, which is associated with data storage server 108. Using the information in the key KEY(1), the data may be easily located and retrieved from the data storage unit 108a. If, however, the data is not found in data storage unit 108a, or has somehow been corrupted, the data retrieval server 104 may again query the key manager 114, this time for the second key KEY(2). The second key KEY(2) would then lead the data retrieval server 104 to the data stored in the data storage unit 106a associated with data storage server 106. The data may then be retrieved from that location and viewed by the user.

Figure 3:
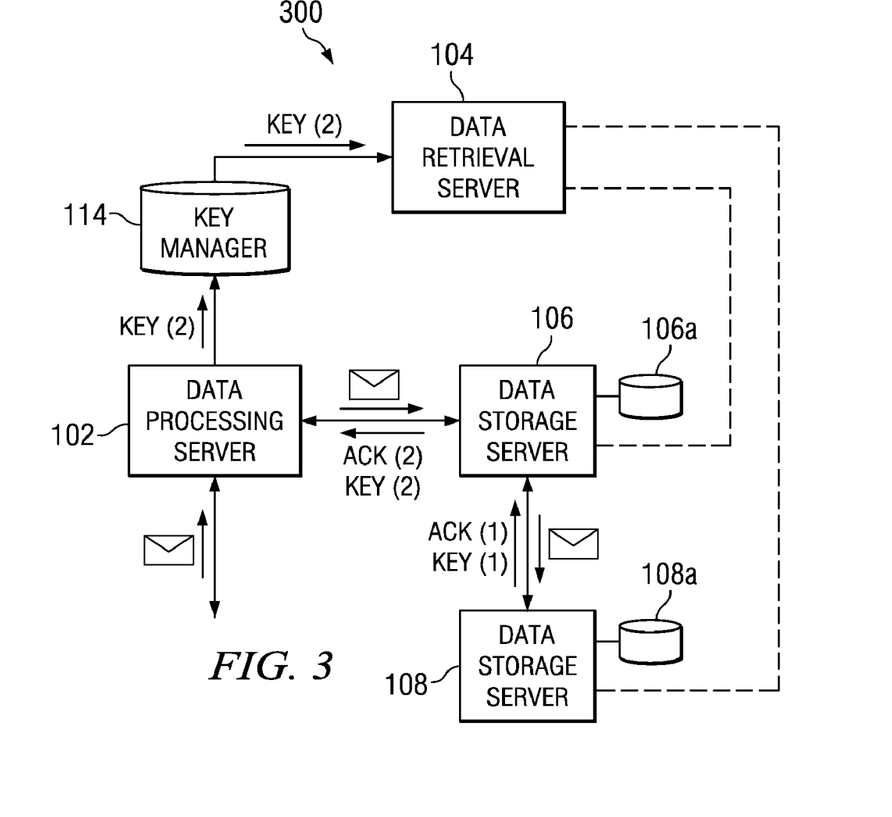
FIG. 3 illustrates another embodiment of a data storage and retrieval system in accordance with the principles disclosed herein.

Looking now at FIG. 3, illustrated is another embodiment of a data storage and retrieval system 300 in accordance with the principles disclosed herein. The system 300 of FIG. 3 illustrates the arrangement of data storage servers 106 and 108 in a master/slave connection. More specifically, the system 300 includes data storage server 106 in the master position, and data storage server 108 in the slave position. With this arrangement, the storing of data to either of the data storage units 106a, 108a associated with the data storage servers 106, 108 passes through data storage server 106, since it is the master server.

The master/slave connection is accomplished by connecting only the master unit, data storage server 106 in this embodiment, to the data processing server 102. In turn, the slave unit, data storage server 108 in this embodiment, is connected directly to the master unit rather than to the data processing server 102. By employing a master/slave connection, the redundant storage of data to the data storage units of a plurality of data storage servers can be handled in a less random manner. More specifically, where other embodiments of a data storage and retrieval system according to the principles disclosed herein store data by the random selection of two or more data storage servers, the master/slave system 300 of FIG. 3 stores data through the selection of only the master data storage server 106. Redundant storage of the data via one (or more) slave data storage server 108 is predetermined through the connection to the master data storage server 106 in the master/slave relationship.

In function, the system 300 of FIG. 3 is similar to the embodiments of systems discussed above. Specifically, a DNS server (not illustrated) maybe queried by the data processing server 102 to determine the IP addresses of available master data storage servers. As before, the connection between the data processing server 102 and the selected master data storage server 106 may be a TCP/IP connection. Of course, if the data processing server cannot establish a connection with the data storage server 106, or the established connection times-out for any of a variety of reasons, the DNS server may again be queried for another available master data storage server. Once an available master data storage server has been identified and the connection established, the data processing server 102 transmits the data to the master data storage server 106 to be written and stored in the data storage unit 106a associated therewith. In addition, the data will also be written to the data storage unit 108a associated with the slave data storage server 108 for redundancy.

When the data is received by the master data storage server 106, the data is also transferred (e.g., mirrored) to the slave data storage server 108. Once the data is so received, it is stored/written in the data storage unit 108a associated with the slave data storage server 108. As discussed above, the data may be written immediately to the data storage unit 108a, or it may be queued in sequential blocks, in the manner described above. Once the data is successfully written to the data storage unit 108a, the process module associated with the slave data storage server 108 transmits an acknowledgement ACK(1) to the master data storage server 106, rather than directly to the data processing server 102 as was done in the embodiments described above. In addition, the process module also transmits a key KEY(1) corresponding to the stored data back to the master data storage server 106, rather than to the data processing server 102.

The writing of the data to the data storage unit 106a associated with the master data storage server 106 also typically occurs in the manner described in the embodiments discussed above. As such, once the data is successfully written to the data storage unit 106a, the process module associated with the master data storage server 106 also generates its own acknowledgement ACK(2) and key KEY(2) corresponding to the stored data. In addition, in embodiments having the master/slave relationship, the process module in the master data storage server 106 is configured to receive the acknowledgement ACK(1) and key KEY(1) from the slave data storage server 108, communicating to the master data storage server 106 that the data write to the slave data storage server 108 was successful. The process module of the master data storage server 106 may then generate its acknowledgement ACK(2) and the key KEY(2) based on the successful writing in both the master and slave units 106a, 108a. The master server may then transmit the single acknowledgement ACK(2) and key KEY(2), rather than two separate acknowledgements and two separate keys, to the data processing server 102, for use as described above. Of course, the use of only one acknowledgement and key simplifies the operation of the system 300, as well as reduces the storage space required to store keys in the key manager 114. However, if an acknowledgement or key is not received by the master data storage server 106 from the slave data storage server 108, the data storage to the master/slave pair of servers is abandoned as unsuccessful, and the data processing server 102 establishes a new connection with a new pair of master/slave data storage servers.

After receiving the key KEY(2), the data processing server 102 stores the key KEY(2) in the key manager 114, as before. The data retrieval server 104 may then be used to retrieve the data from one or both of the data storage units 106a, 108a by querying the key manager 114 to find the appropriate key corresponding to the stored data. In a particularly advantageous embodiment of the master/slave system 300, the data stored in the data storage units 106a, 108a is correlated for keeping track of the stored data. Such storage correlation may be accomplished by storing the data in identical data buckets within the data storage units 106a, 108a. As a result, the data is redundantly stored in the same order and in the same file/location on both data storage units 106a, 108a. With such an arrangement, data may more easily be located in either data storage unit 106a, 108a without having to scan the entire drive(s) of the units 106a, 108a looking for the specific data sought to be retrieved. In embodiments with such redundant data storage, if the data is not found or has been corrupted in data storage unit 106a of the master data storage server 106, for example, the data retrieval server 104 may simply retrieve the data from the data storage unit 108a associated with the slave data storage server 108 using the same key KEY(2). Furthermore, in a more specific embodiment, the process module associated with the master data storage server 106 may be configured to cause the slave data storage server 108 to store the mirrored data, rather than having the data processing server 102 directly execute the writing of the data to both data storage units 106a, 108a.

Figure 4:
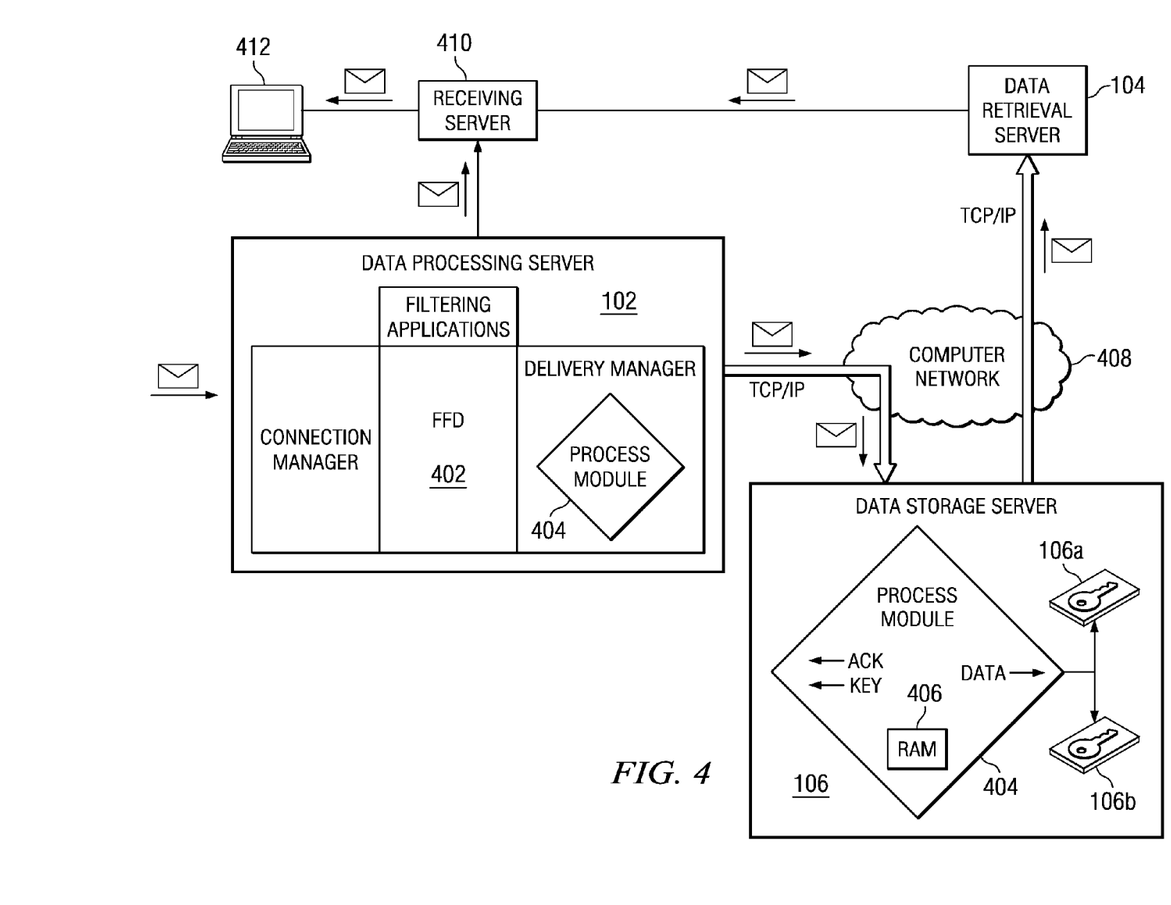
FIG. 4 illustrates a more detailed view of several components of a data storage and retrieval system as disclosed herein.

Referring now to FIG. 4, illustrated is a more detailed view of several components of a data storage and retrieval system 400 as disclosed herein. The system of FIG. 4 still includes the data processing server 102, data retrieval server 104 and data storage server 106 described in the various embodiments discussed above. In addition, FIG. 4 illustrates an embodiment of a fast-filter daemon (FFD) 402 associated with the data processing server 102. The FFD 402 may be any of a number of filtering processes configured to filter incoming data for distribution to a plurality of destinations. In this specific embodiment, the FFD 402 is provided and configured to filter incoming e-mail messages. The FFD 402 uses a connection manager to establish a connection to receive incoming mail, filter applications to filter the incoming messages, and a delivery manager for directing the message to the appropriate location. A process module of the type discussed above is also associated with the delivery manager to facilitate the transmission of filtered data to the appropriate servers.

Also illustrated in FIG. 4 is the process module 404 associated with the data storage server 106. It should be understood that although FIG. 4 illustrates both the data processing server 102 and data storage server 106 having the process module 404, the two process modules 404 are not necessarily identical. Rather, the process module 404 is shown in both components to illustrate the fact that the process module 404 is a collection of code or other type of computer instructions that is executed in several components simultaneously for different purposes. In addition, in other embodiments, the process module 404 may be located in a central location and configured to operate with remote modules associated with the data processing server 102 and data storage server 106.

Associated with the process module 404 in the data storage sever 106 is a random access memory (RAM) module 406. Although only one RAM module is shown in the embodiment of FIG. 4, the system 400 may include any number of RAM modules, located in any or all of the components, as each application requires. Among the tasks that the process module 404 may typically be configured to perform are, for example, sequentially spooling incoming data in the RAM module 406 until the current data block is filled and therefore ready to be written. In addition, once the data is ready for storage, the process module 404 causes the data to be written to one of a plurality of available data storage units 106a, 106b associated with the data storage server 106.

The system 400 also illustrates a computer network 408, which may be a packet-based network such as the Internet. As shown, the data processing server 102, data retrieval server 104, and data storage server 106 are coupled to the computer network 408. In an advantageous embodiment, the interconnection of these devices via the computer network 208 is made using TCP/IP protocol connections, as illustrated, but the system 400 is not so limited. By employing TCP/IP connections across a computer network 408, the system 400 enjoys substantial utility in that the various components comprising the system 400 may be distant from one another, using the computer network 408 as a corridor for the transmission of data.

The system 400 functions by first receiving incoming data, for example, in the form of e-mail messages and message data, through the data processing server 102. As mentioned above, the incoming data may be sent from a user via a sending server (not illustrated). Also, such a sending server may be coupled to the computer network 408 as well, for transmission of the data to the system 400. When the data processing server 102 receives the data, the FFD 402 filters the data according to predetermined parameters. By filtering the data, some data is determined to not be diverted (quarantined or re-routed), and is transmitted directly to a receiving server 410, and then on to a receiving terminal 412 where the data may be read. Additionally, other data is determined to need diverting by the FFD 402, such as spam e-mails, and is thus transmitted to an available data storage server (e.g., data storage server 106) for storage of the filtered data by the FFD 402 and process module 404 associated therewith. The FFD 402 may be configured to filter incoming data in any of the manners set forth in either of the above-identified patent applications, or using any other appropriate technique.

When the data is ready for storage, the process module 404 then attends to the storage of the data in the data storage units 106a, 106b associated with the data storage server 106 in any of the various manners described above. An acknowledgement ACK(1) of the successful data storage, as well as a data storage information key KEY(1) may then be generated and transmitted back to the data processing server 102 by the process module 404. Finally, if the user at the receiving terminal 412, who may be the originally intended recipient of the data, determines that he would like to view the stored e-mail message or message data, the user may prompt the data retrieval server 104 to retrieve the data via the appropriate data storage server 106. As illustrated, such data retrieval may also occur across the computer network 408, but the system 400 is not so limited. In other embodiments, the data retrieval server 104 may be proximate to the data storage server 106, while the retrieved data is transmitted from the retrieval server 104 to the receiving server 410 via the computer network 408.

For data storage and retrieval systems constructed and employed as disclosed herein, such as those discussed with respect to FIGS. 1-4, commands and other actions are used by the process modules in order to effect the actions described in this application. For example, the data processing servers 102 may establish TCP/IP connections to the data storage servers via a TCP/IP connection by initiating a CONNECTION command. An available data storage server 106 would than accept the connection by a unique response acknowledgement. This may typically be accomplished by using the system's operating system library call "CONNECT".

Other exemplary commands that may be sent from the data processing server 102 include a NEW BUCKET command for establishing new data buckets on the data storage unit(s) associated with a data storage server 106 in order to store the incoming data, and a PUT command for writing data into specified data buckets. The data storage server 106 might respond with different acknowledgements to inform the data processing servers of whether the data bucket was created, already existed, or if for some other reason the data bucket could not be created. This NEW BUCKET command may include fields for specifying the maximum file size to which files in the bucket may grow and for specifying the amount of time to keep a file open for the writing of data. The PUT command would be used to store or write data chunks in a specified data bucket, and it could include fields for establishing the boundaries of the metadata and data to follow. The data storage server 106 responds to the command with an acknowledgement that the data has been effectively received and written into the data storage unit(s). As described above (and with reference to FIG. 6), a key is sent back with or as a part of the data storage server's 106 acknowledgement of the successful write, and the key may be later used to retrieve specific data from a particular data bucket using a GET command, as described herein.

A GET command may be used to retrieve the key identifying the location of the data and to find the bucket holding the data. If the key matches the data storage unit associated with the current data storage server 106, then the data storage server 106 may respond with the characteristics of the particular group of data sought by the data retrieval server 104, followed by the data sought. If the particular data sought by the GET command is not available through the data storage server 106 designated, it would provide an indication of that in its response message. Other commands can be used to retrieve particular metadata describing certain data, for updating or other processing, or even certain data by itself. Still other commands may be sent by the data processing server 102 or retrieval server 104 in order to delete certain data buckets, or to close the connection between a data processing server 102 or retrieval server 104 and a particular data storage server.

Furthermore, an SEL (select) command may be used to search for stored data, which is specified in a key. Specifically, such a command can return the appropriate key associated with the stored data, and then the metadata and data found at the location set forth in the key. Moreover, in some embodiments, the SEL command may be used to iterate over a bucket, selecting all matching data chunks. In such an embodiment, the key of the last selected record is needed to select the next record, thus a special key value of "start" will cause the SEL command to begin searching at the start of the bucket. Still further, any retrieval of data is more efficient with the present system since the sequential storage of data chunks mentioned above, also allows the sequential reading of the data, thus reducing rotational delay and seek times for storage units.

Figure 5:
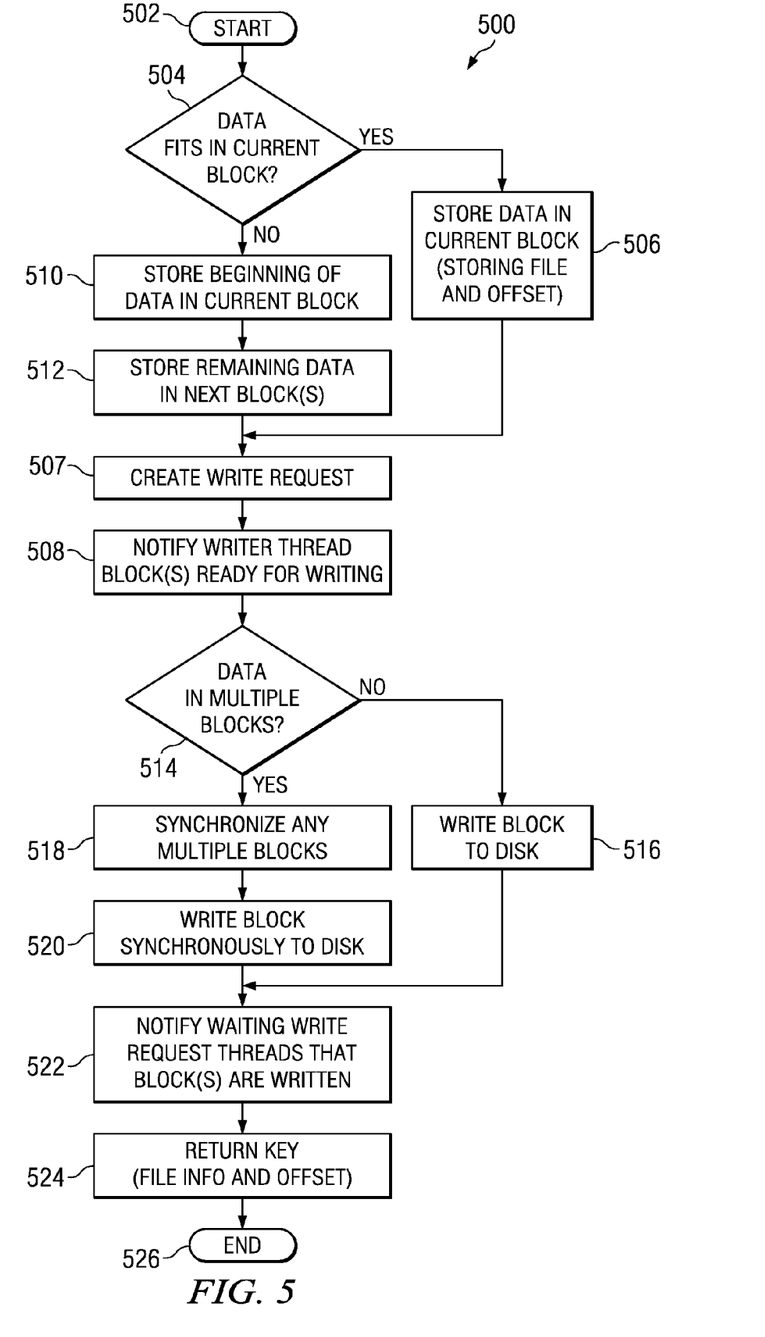
FIG. 5 illustrates a flow diagram of a process for writing data to storage drives in a data storage and retrieval system in accordance with the principles disclosed herein.

Turning now to FIG. 5, illustrated is a flow diagram 500 of a process for writing data to storage drives in a data storage and retrieval system constructed in accordance with the principles disclosed herein. More specifically, the process is employed by a process module(s) associated with data storage servers to facilitate the storage of incoming data for later retrieval, modification or deletion. In addition, the illustrated embodiment of the process includes the storing of data that is too large to fit in a single block, such as the typical 64 kb data block mentioned above, into consecutive data blocks. The process begins at a start block 502.

At a decision block 504, the process module first determines whether the incoming data that is to be stored fits into the currently available data block. For example, if the current data block is a 64 kb block, it is determined whether the data, along with the header and any other information necessary to be stored with the data, is less than the size of the available data block. If it is determined that the incoming data does fit in the data block, the process moves to block 506 where the data is moved into the available data block, which will eventually be stored on a data storage unit, such as hard disk drive. Once the data is in the current data block, the process moves to block 508 where the writer thread associated with the data storage unit is notified that the data block is ready for writing. A write request thread is then created for the data at block 507.

If it is determined at decision block 504 that the incoming data does not fit into a single data block, the process moves to block 510 where the beginning portion of the incoming data is stored in the current data block. The process then moves to block 512 where the remainder of the incoming data is moved to the next available data block. This portion of the process continues until all of the incoming data to be stored is held in multiple data blocks. A write request thread is then created for the multiple data clocks at block 507. Then, the process moves to block 508 where a writer thread associated with the data storage unit is notified that the plurality of data blocks is ready for writing. Although only one write request thread and one writer thread are discussed, it should be understood that typically a connection from each of a plurality of data processing servers, for storing data chunks, will create a separate corresponding write request thread. In one embodiment, only a limited number of writer threads are available in each data storage server. As a result, the write request threads are spooled pending the completion of a write by one of the writer threads. Whether spooled during such high traffic situations or not, one of the writer threads is notified of a waiting write request thread at block 508.

Once the writer thread has been notified, the process moves to block 514 where it is determined whether the data is held in a single data block or in multiple data blocks, as created in blocks 510 and 512 of the process. If it is determined that the data is held in a single data block, the process moves to block 516 where the writer thread proceeds to write the data block to the data storage unit. However, if it is determined that the data is held in multiple data blocks, the process moves to block 518 where the process module synchronizes all of the multiple data blocks for the incoming data. Once synchronized, the process moves to block 520 where the multiple data blocks are synchronously written to the data storage unit. After the data block(s) has been written, and thus the data is safely stored in the storage unit, the process moves to block 522 where the write request thread, as well as any waiting write request threads, are notified that the data block(s) has been written, and the writer thread is ready for the next block or set of blocks.

Once the appropriate write requests have been notified, in accordance with block 522 of the process, the process then moves to block 524. At block 524, the process module returns a data storage information key to the data processing server that transmitted the data for storage. As indicated, in an advantageous embodiment, the key includes file number information for the file holding the data and offset information for determining the location of the stored data in the data storage unit. In another embodiment, the process module running in the data storage server may be configured to create storage server information, as well as data bucket information, in the key. The different types of information contained in the key are discussed in detail with reference to FIG. 6 below. In addition, an acknowledgement may be sent by the process module, as described above, acknowledging the successful storage of the data. The process then ends at block 526.

Although only specific steps of the process are illustrated herein, data storage and retrieval processes conducted in accordance with the principles disclosed herein may include a greater or lesser number of steps than those illustrated in FIG. 5, and such processes are not limited to any particular number of process steps. In addition, a read request for the stored data chunks follows a similar, yet less complicated pattern. For a data read, a read request thread is created with a connection from a data retrieval server to the data storage server holding the data. The read thread then simply use the information in the returned key to locate the desired data and read, modify, or delete it, depending on the application.

Moreover, although the process illustrated in the flow diagram of FIG. 5 illustrates the breaking up of an incoming data chunk into multiple data blocks, and then synchronizing the multiple data blocks by sequentially arranging them, such steps may also be employed for synchronizing separate data chunks into sequential data blocks. In such an embodiment, the concatenated data blocks may then be quickly written in a single writing step by the writer thread, rather than stopping and writing each chunk of incoming data to the appropriate data storage unit.

Figure 6:
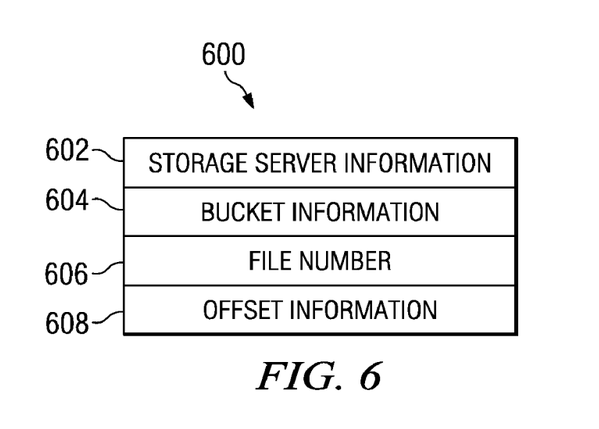
FIG. 6 illustrates a block diagram of one embodiment of a data storage information key.

Looking next to FIG. 6, illustrated is a block diagram of one embodiment of a data storage information key 600. In this embodiment, the key 600 includes storage server information 602. Typically, the storage server information 602 will comprise an identification of the data storage server in which the particular data chunk is stored. In a specific embodiment, the storage server information 602 is created by the a process module running within the data storage server holding the data, but other components may also be configured to generate the storage server information 602 in the key 600. In another embodiment, the storage server information 602 is generated by the data processing server, since the data processing server has identified in which data storage server the data is to be stored.

The key 600 also includes bucket information 604. Generally, the bucket information 604 comprises any type of information used to identify a group of data. In one example, the bucket information 604 may includes client numbers to help organize data buckets for each client. In another embodiment, the bucket information 604 comprises expiration date information related to the date the portion of incoming data stored by the data storage and retrieval system will be deleted. For example, the deletion information 604 may be included in the key 600 so that all data corresponding to that expiration date (e.g., 14 days from the storage date) may be deleted in one step by employing all keys with the desired expiration date to locate all the stored data corresponding to that date information. In an alternative embodiment, only one key corresponding to the desired deletion date may be used to find all the data stored on a particular date and thus ready for deletion. In such an embodiment, a system according to the principles disclosed herein may then delete all data chunks within any number of data storage servers corresponding to the date contained in the deletion information 604. The key 600 of FIG. 6 also includes file numbers 606. The file number 606 simply identify particular files within each bucket that holds the stored data. Also illustrated in the key 600 of FIG. 6 is offset information 608. In one embodiment, the offset information 608 comprises location information for the data stored in a data storage unit. More specifically, the offset information 608 may include information to point the data storage server to the header of the stored data in order to locate the data in the data storage units. Other examples of offset information 608 includes the file name, which may then point to the location of the beginning of the specific data string with respect to a known location on the disk on which the data is written (i.e., the "offset"). By employing the offset information 608, the process module in a data storage server may be prompted by a data retrieval server to access the offset information 608 in the key 600 in order to locate and retrieve the specified data.

Furthermore, in an advantageous embodiment, the data processing server may be configured to generate the storage server information 602, as well as the bucket information 604, since the data processing server is the component making the connection with the selected data storage server. Similarly, the data storage server associated with the data storage unit holding the data generates the file number 606 where the data is stored, and the offset information 608. Of course, although only limited information is shown associated with the key 600, it should be understood that a data storage and retrieval system according to the principles disclosed herein is not limited to only those types of information. As a result, the list of various types of information illustrated in FIG. 6 is not exhaustive.

Figure 7:
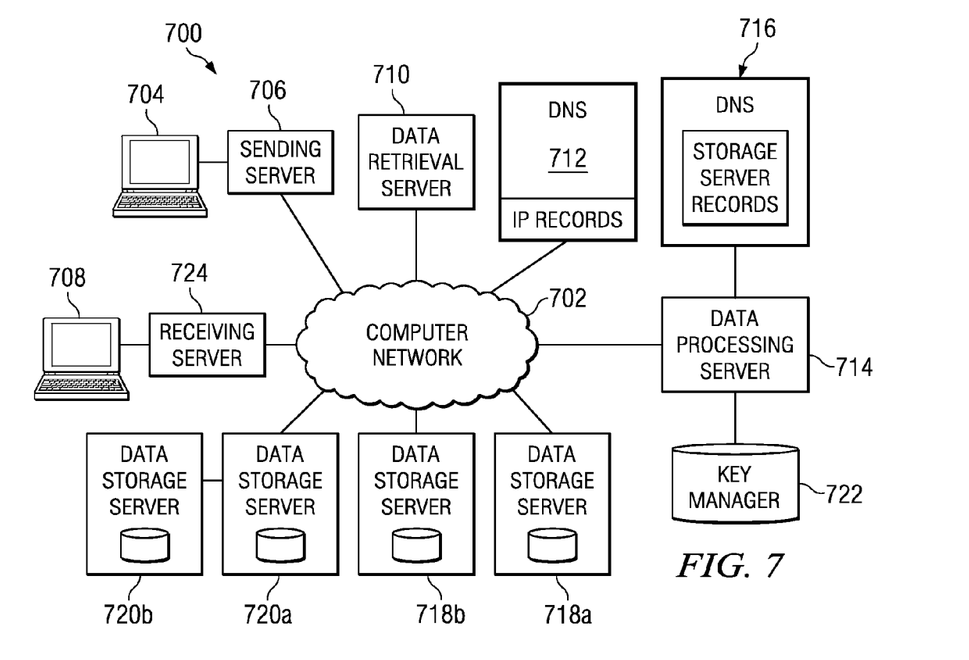
FIG. 7 illustrates yet another embodiment of a data storage and retrieval system constructed according to the principles disclosed herein.

Turning now to FIG. 7, illustrated is yet another embodiment of a data storage and retrieval system 700 constructed according to the principles disclosed herein. The system 700 includes a computer network 702, which may be a packet network such as the Internet, or may even be an internal Ethernet-based local area network (LAN). Accordingly, the system 700 is not limited for use with any particular type of computer network 702.

The system 700 of FIG. 7 also includes a sending user terminal 704 for use by a user sending data (e.g., an e-mail message) to a receiving user. The sending user accesses the sending terminal 704 (which may simply be a home computer) to send the data, which is sent via the computer network 702 to the receiving user accessing a receiving terminal 708. As mentioned above, if the transmitted message data is not filtered, it arrives at the receiving terminal 708 via a data retrieval server 710, which is also a data retrieval server for the intended receiver of the data. Also as before, to be routed to the appropriate retrieval server 710, and thus the intended receiving terminal 708, a DNS server 712 is coupled to the computer network 702 for translating the address information entered by the sending user to the actual IP address of the intended receiver.

If the transmitted data is to be filtered, for example, because it is spam e-mail, the filtering daemon in the data processing server 714 may do the filtering. Once the data is filtered, it is then stored for a predetermined period of time, in case it needs to be accessed. To store the data, in accordance with the principles disclosed herein, the data processing server 714 employs a second DNS server 716 to obtain the addresses of groups of available data storage servers 718a, 718b, 720a, 720b, In the illustrated embodiment, two groups are determined to be available: a first group of data storage servers 718a, 718b, and a second group of data storage servers 720a, 720b.

As illustrated, the first group of data storage servers 718a, 718b is coupled to the computer network 702 in a parallel configuration. As a result, both of the data storage servers 718a, 718b are accessed directly by the data processing server 714 to store the data. Conversely, the second group of data storage servers 720a, 720b are coupled to the computer network 702 in a master/slave configuration. As a result, the data processing server 714 accesses only the master data storage servers 720a to store the data, and the master process module associated with the master server 720a handles the redundant storage of the data in the slave server 720b, Accordingly, either group of data storage servers 718a, 718b, 720a, 720b may be employed for redundant storage of the data, in accordance with the various exemplary embodiments and principles disclosed herein.

An advantage of the data storage and retrieval system 700 in FIG. 7 is the transmission of data for storage in the data storage servers 718a, 718b, 720a, 720b across the computer network 702, rather than only across a local connection between the data processing server 714 and the data storage servers 718a, 718b, 720a, 720b, As a result, the system 700 illustrates that any or all of the data storage servers 718a, 718b, 720a, 720b used to store the data may be geographically located a great distance away from the data processing server 714, if desired. Once the data is stored in either of the groups of data storage servers 718a, 718b, 720a, 720b, the specific group sends the appropriate acknowledgements and keys back to the data processing server 714 across the computer network 702. Once received, the keys may be stored in a key manager 722, such as an Oracle® database, for use at a later time to retrieve or mass delete the stored data.

If the intended receiver of the message data desired to retrieve the stored data, for example, if he determines that the data was not "junk e-mail" and was improperly intercepted and stored, the user may simply access his terminal 708. The receiving terminal 708, which may simply be the user's home computer, then communicates with the appropriate data storage server 718a, 718b, 720a, 720b via the receiving server 724 and across the computer network 702 to retrieve the data. As discussed above, the key(s) are accessed from the key manager 722 corresponding to the specific data sought to be retrieved from the data storage units holding the data, via the appropriate one of the data storage servers 718a, 718b, 720a, 720b. More specifically, the key allows the data to be located in its specific location on a data storage unit associated with the appropriate data storage server 718a, 718b, 720a, 720b. Once the key is used to locate the data, the data is retrieved across the computer network 702, and presented for viewing by the user at the receiving terminal 708. As before, if the data cannot be found on one of the data storage servers 718a, 718b, 720a, 720b, or has been corrupted, another key corresponding to the redundant location of the data (e.g., the data storage unit associated with the slave data storage server 720b) may be retrieved from the key manager 722 and used to retrieve the data from its second storage location.

Figure 8:
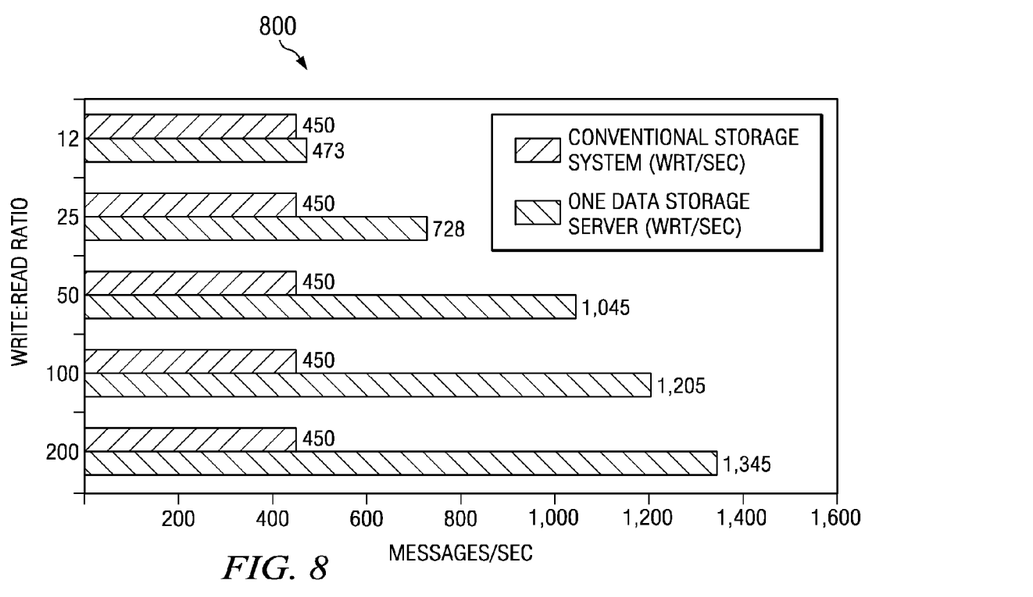
FIG. 8 illustrates a bar graph illustrating a comparison between a conventional data storage system and a data storage and retrieval system constructed employing the present principles.

Looking finally at FIG. 8, illustrated is a bar graph 800 illustrating an exemplary comparison between a conventional data storage system and a data storage and retrieval system employing the present principles. Specifically, the graph 800 illustrates the advantages with respect to the speed of writing message data for storage, as compared to conventional data storage systems. Although the displayed results may not be achieved in comparison with every type of conventional system, the graph illustrates actual results achieved by the inventors. For this comparison, the conventional system compared was a typical file storage system, such as a large EMC Symmetrix RAID storage system employing a Veritas® file system.

As is shown, the message writing capabilities of a single data storage server in a data storage and retrieval system constructed according to the principles disclosed herein far exceed the capabilities of the conventional system, especially as the write:read ratio of data increases. Such capabilities are partially achieved in this example by spooling the data into data blocks of predetermined size, as described above, before writing the data blocks to the data storage server in a single consecutive write. By spooling the data in data blocks, the writer thread in each data storage server may store the data in a single write of concatenated data streams, rather than having to create and write a new file for each stream of data to be stored, when the system experiences periods of high traffic. Even the deletion of stored data may be accelerated by simply employing a key to mass delete all corresponding data (e.g., a data bucket), rather than having to individually seek each data file slated for deletion, as is typically the case in conventional storage systems. Such capabilities greatly decrease the rotational delay, as well as the seek time, for HDDs used in the system to store the incoming data.

In addition, a TCP/IP connection with the data storage servers also allows quick access to the servers for fast data storage, as well as a quick and flexible configuration for expansion or reduction in the number of data storage servers employed in the system. Moreover, multiple data storage servers, as well as the associated process modules employing the present principles, may be added to the system, further increasing the speed capabilities of the system, by simply updating a DNS server, or similar component, with the TCP/IP information of the added server(s). The benefits of expanding the system as such are even more evident when the system is configured such that each data storage server performs nearly simultaneous writes with its companion data storage servers in high traffic situations. Furthermore, redundant data storage may also be achieved without excessively taxing the entire system by simply adding more data storage servers in a mirroring configuration, or connecting data storage servers in master/slave relationships. The speed of the system may be maintained by selecting random pairs of available data storage servers for either writing the data immediately, or spooling the data in consecutive blocks for an efficient single write when the corresponding writer thread is free. In the novel system, if certain data storage servers are experiencing high traffic, the system simply finds a new pair to store the data, rather than waiting for the single writer thread in a conventional database system to finish writing each chunk of data as a separate file. Likewise, if a connection with a data storage server cannot be made or maintained, the system simply finds a new pair to store the data, rather than waiting for the connection to complete, or a reconnection to occur.

While various embodiments of a data storage and retrieval system constructed according to the principles disclosed herein, as well as related methods for storing and retrieving data, have been described above, it should be understood that they have been presented by way of example only, and not limitation. Thus, the breadth and scope of the invention(s) should not be limited by any of the above-described exemplary embodiments, but should be defined only in accordance with the following claims and their equivalents. Moreover, the above advantages and features are effected in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A data storage and retrieval system, comprising:
a data processing server configured to receive incoming data and to transmit the data for storage;
a plurality of data storage servers each coupled to one or more data storage units and configured to receive transmitted data for writing to the one or more data storage units, and configured to read data from the one or more data storage units;
a data retrieval server coupled to one or more of the plurality of data storage servers and configured to retrieve data read by the one or more data storage servers from the one or more data storage units; and
a plurality of process modules each associated with one of the plurality of data storage servers, at least two of the process modules each configured to write a portion of the data to a corresponding data storage unit, each of the at least two process modules further configured to transmit an acknowledgment associated with the corresponding data storage unit upon the writing of the portion of data in the corresponding data storage unit,
wherein a first of the at least two data storage servers associated with a first data storage unit is coupled to a second data storage server associated with a second data storage unit, and wherein the process module in the first data storage server is configured to transmit an acknowledgment associated with each of the first and second data storage servers in response to:
(i) receiving an acknowledgment from the process module in the second data storage server based on the writing of the data portion in the second data storage unit, and
(ii) the writing of the data portion in the first data storage unit.

2. A data storage and retrieval system according to claim 1, wherein the process module associated with the first data storage server is configured to transmit an acknowledgment from each of the at least two data storage servers to the data processing server.

3. A data storage and retrieval system, comprising:
a data processing server configured to receive incoming data and to transmit the data for storage;
a plurality of data storage servers each coupled to one or more data storage units and configured to receive transmitted data for writing to the one or more data storage units, and configured to read data from the one or more data storage units;
a data retrieval server coupled to one or more of the plurality of data storage servers and configured to retrieve data read by the one or more data storage servers from the one or more data storage units; and
a plurality of process modules each associated with one of the plurality of data storage servers, at least two of the process modules each configured to write a portion of the data to a corresponding data storage unit, each of the at least two process modules further configured to transmit an acknowledgment associated with the corresponding data storage unit upon the writing of the portion of data in the corresponding data storage unit,
wherein at least two of the plurality of data storage servers comprise a first group of data storage servers coupled to corresponding data storage units and at least two others of the plurality of data storage servers comprise a second group of data storage servers coupled to corresponding data storage units, and wherein each of the plurality of process modules is further configured to transmit an acknowledgment associated with corresponding data storage servers of the second group in response to the writing of the data portion to the data storage units associated with the second group of data storage servers regardless if the data portion is written to the data storage units associated with data storage servers of the first group.

4. A method for storing and retrieving data, comprising:
receiving incoming data and transmitting the data for storage using a plurality of data storage servers;
writing a portion of the data in at least two data storage units, one or more of the at least two data storage units coupled to corresponding ones of the plurality of data storage servers;
transmitting an acknowledgment associated with each of the at least two data storage units upon the writing of the data portion in the at least two data storage units; and
retrieving the data portion from one or more of the at least two data storage units, wherein transmitting an acknowledgment associated with each of the at least two data storage units further comprises transmitting the acknowledgements from a first process module in a first of the plurality of data storage servers in response to:
(i) receiving an acknowledgment from a second process module in a second of the plurality of data storage servers coupled to the first of the plurality of data storage servers, and based on the writing of the data portion in a second of the at least two data storage units, and
(ii) writing the data portion in a first of the at least two data storage units.

5. A data storage and retrieval system comprising:
a data processing server configured to receive incoming data and to transmit the data for storage;
a plurality of data storage servers each coupled to one or more of a plurality of data storage units and configured to receive a portion of the data for writing to at least two of the data storage units;
a data retrieval server coupled to one or more of the plurality of data storage servers and configured to retrieve the data portion received by the one or more data storage servers and written to the at least two data storage units from one or more of the at least two data storage units;
data storage information keys corresponding to each of the data storage units and comprising offset information corresponding to the location of the data portion in the at least two data storage units; and
a key manager associated with the data retrieval server and configured to store the data storage information keys therein,
wherein the data storage information keys further comprise deletion information corresponding to a date on which the data portion written to the at least two data storage units is deleted.

6. A data storage and retrieval system according to claim 5, wherein the data processing server is further configured to generate the deletion information.

7. A data storage and retrieval system according to claim 5, wherein the data storage units are configured to delete the data portion on a predetermined date corresponding to the deletion information.

8. A method for storing and retrieving data, comprising:
receiving incoming data and transmitting the data for storage;
writing a portion of the data in at least two data storage units;
creating data storage information keys corresponding to each of the at least two data storage units and comprising offset information corresponding to the location of the data portion in the at least two data storage units;
storing the data storage information keys in a key manager; and
retrieving the data portion from one or more of the at least two data storage units,
wherein the data storage information keys further comprise deletion information corresponding to a date on which the data portion written to the at least two data storage units is deleted.

9. A method according to claim 8, further comprising deleting the stored data portion from the at least two data storage units on the date corresponding to the deletion information.

10. A method for storing and retrieving data, comprising:
providing a plurality of data storage servers each coupled to one or more data storage units;
receiving incoming data and transmitting the data for storage in the data storage units using the plurality of data storage servers;
writing a portion of the data in at least two data storage units coupled to distinct ones of the plurality of data storage servers;
creating data storage information keys corresponding to each of the at least two data storage units and to the distinct ones of the plurality of data storage servers corresponding to the at least two data storage units, the storage information keys comprising storage server information identifying the distinct ones of the plurality of data storage servers corresponding to the at least two data storage units, and offset information corresponding to the location of the data portion in the at least two data storage units;
storing the data storage information keys in a key manager; and
retrieving the data portion from one or more of the at least two data storage units,
wherein retrieving the data portion further comprises identifying the distinct ones of the plurality of data storage servers, and locating the data portion in one or more of the at least two data storage units using at least one of the data storage information keys, and retrieving the located data portion.

* * * * *